United States Patent [19]

Magrath et al.

[11] 3,830,410

[45] Aug. 20, 1974

[54] LIQUID DISPENSER OF THE METERING TYPE

[75] Inventors: Joseph M. Magrath, P.O. Box 148, McCook, Nebr. 69001; William J. Martin, Watervliet, Mich.

[73] Assignee: said Magrath, by said Martin

[22] Filed: Oct. 6, 1972

[21] Appl. No.: 295,480

Related U.S. Application Data

[63] Continuation of Ser. No. 64,311, Aug. 17, 1970, abandoned.

[52] U.S. Cl. .................. 222/309, 222/318, 222/340
[51] Int. Cl. ............................................ G01f 11/06
[58] Field of Search ............ 222/72, 309, 318, 340, 222/402.16

[56] References Cited
UNITED STATES PATENTS

| | | | |
|---|---|---|---|
| 2,755,979 | 7/1956 | Lawson et al. | 222/250 X |
| 3,162,336 | 12/1964 | Erickson | 222/309 |

OTHER PUBLICATIONS

"When You Can't Pour a Drink, You Need a Water Pistol" Product Engineering, June 6, 1966, page 33.

*Primary Examiner*—Stanley H. Tollberg
*Assistant Examiner*—John P. Shannon
*Attorney, Agent, or Firm*—William Griffith Edwards

[57] ABSTRACT

A liquid dispenser particularly suited for the external spreading of insecticide liquids on the backs of cattle and other animals and for oral drenching of cattle, sheep and other animals comprises a rigid body and an elongated barrel or nozzle element formed in pistol-like configuration. The body is shaped to provide a grip of elongated cross section adjacent the barrel and a cylindrical chamber and spring biased piston below the grip. The piston compresses the spring when liquid is admitted to the chamber under pressure from a pressure connection on the barrel. The stroke of the piston is adjustable to set the quantity of liquid to be discharged and the adjustment device assures compression of the spring to the same degree regardless of the quantity of liquid to be discharged.

3 Claims, 3 Drawing Figures

PATENTED AUG 20 1974

3,830,410

LIQUID DISPENSER OF THE METERING TYPE

This is a continuation of Application Ser. No. 64,311, filed Aug. 17, 1970, now abandoned.

This invention relates to liquid dispensers for discharging metered quantities of liquid and particularly to an improved dispenser for insecticide liquids and oral drenching liquids and the like.

There are many applications for metering type liquid dispensers which afford adjustment to select the quantity of liquid discharged. Various forms of such dispensers have been provided heretofore; however, they have not proved entirely satisfactory for all applications. In the field of applying insecticide liquids to the backs of cattle and other animals, by way of example, it is desirable to provide a convenient and easily manipulated handpiece for directing a jet or spray of liquid onto the animal and also to discharge the liquid at the same rate regardless of the quantity to be used. Accordingly, it is an object of this invention to provide a hand held liquid dispensing device including an improved metering and discharge control arrangement.

It is another object of this invention to provide a hand device of improved construction for discharging insecticide liquids and the like onto surfaces to be treated.

It is another object of this invention to provide a liquid dispenser of the metering type including an improved arrangement for effecting discharge at a uniform rate regardless of the quantity of liquid to be discharged.

It is a further object of this invention to provide a liquid dispenser of the metering type applied from a source of liquid under pressure including an improved arrangement for discharging the liquid at a predetermined pressure regardless of the liquid supply pressure.

Briefly, in carrying out the objects of this invention, in one embodiment thereof, a hand held device for discharging a spray or a jet of liquid is provided which comprises an elongated barrel mounted at the upper end of a main body having a liquid containing and measuring chamber shaped to provide a pistol type grip for the barrel. The lower portion of the body is cylindrical and has a diaphragm sealed piston mounted therein. The piston is biased by a compression spring to the minimum volume position of the liquid chamber, and is moved away from that position to a stop position upon the admission of liquid under pressure to the liquid chamber. The stop comprises a base for the spring positioned to engage a cylindrical inverted cup at the maximum volume position of the piston. The maximum volume is adjustable by changing the position of the stop. A valve rod in the barrel is biased to hold an inlet valve open and admit liquid under pressure to the chamber while closing a discharge valve. On forward movement of the end the inlet valve is closed and the outlet valve opened to discharge liquid from the chamber by movement of the spring biased piston.

The features of novelty which characterize this invention are pointed out with particularity in the claims annexed to and forming a part of this specification. The invention itself, however, both as to its organization and method of operation together with further objects and advantages thereof will best be understood from the following description taken in connection with the accompanying drawing in which:

Figures 1, 2, 3:
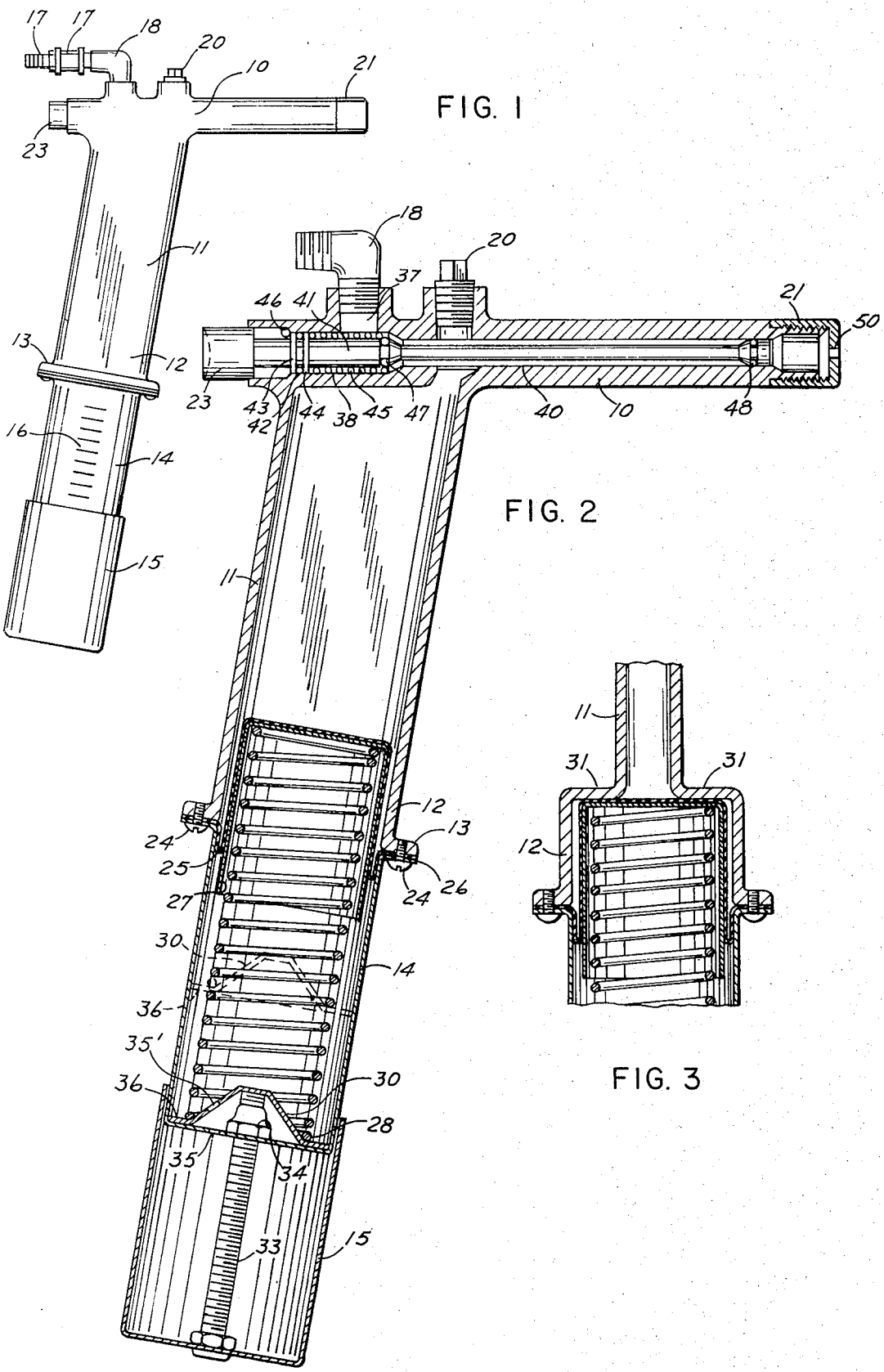
FIG. 1 is a side elevation view of a liquid dispenser embodying the invention.
FIG. 2 is an enlarged sectional side elevation view of the dispenser of FIG. 1.
FIG. 3 is a partial sectional view taken along the line 3—3 of FIG. 2.

Referring now to the drawings, the dispenser illustrated in FIG. 1 comprises a horizontal barrel 10 formed integrally with a pistol grip type body 11, the barrel and body being cast in one piece. The body 11 is shaped to provide a comfortable pistol grip and extends at an angle less than 90° to the barrel 10. The lower portion of the body indicated at 12 is of cylindrical configuration and has a flange 13 at the lower end thereof. A cylindrical extension of the body indicated at 14 is secured to the flange 13 and has an adjustable cylindrical member 15 at the lower end thereof which is provided to afford adjustment of the quantities of liquid to be discharged through the valve 10. Suitable graduations, as indicated at 16, may be provided on the cylindrical portion 14 to indicate the position of the adjusting member 15 in quantities or amounts of liquid to be discharged. Liquid under pressure is supplied to the barrel 10 from a conduit 17 to a coupling 17' and an elbow 18. A plug 20 is provided for access to the interior of the barrel 10 and a detachable nozzle 21 is secured to the forward end of the barrel. The supply line 17 may be connected to the interior of the barrel by removing the plug 20 and inserting the line connection. This continuous discharge from the line to the nozzle may be used if desired.

The dispenser is operated by setting the member 15 to the desired graduation 16 so that when the pressure fluid is admitted through the elbow 18 the dispenser is filled to the required amount. In order to use the dispenser, it is directed toward the surface to be treated and a button 23 is then pressed to cut off the supply of liquid under pressure and discharge the stored liquid through the nozzle 21 onto the surface to be treated.

The internal structure of the dispenser is illustrated in FIGS. 2 and 3. As illustrated in this sectional view, the body 11 provides a hollow chamber therein, the upper portion of which is of elongated cross section as apparent from FIG. 3. The lower cylindrical portion as shown is attached to the extension 14 of the body by a plurality of screws 24 which clamp a flexible diaphragm 25 securely between the flange 13 and a complementary flange 26 formed on the cylinder wall 14. The diaphragm 25 together with an inverted cylindrical cup 27 constitute a piston which is urged upwardly by a spring 28 compressed between the piston and an adjustable stop member 30 having a configuration of an inverted flanged dish is shown resting against the bottom of the cylinder 14. In its top or minimum volume position, the spring presses the piston against shoulders formed on either side of the handle section 11, as clearly shown in FIG. 3. The shoulders indicated at 31 are formed by the change in configuration between the upper and lower parts of the body portion 11.

The position of the stop member or plate 30 may be adjusted by turning the cylindrical cap member 15 which has a threaded shaft member 33 attached to its end and extending inwardly and threaded into a nut 34 rigidly attached to the inner bottom wall of the cylindrical body portion 14. The rod 33 is rotatable with respect to the stop 30 and when it is threaded inwardly by turning the cap 15, the stop moves upwardly and may, by way of example, be positioned as indicated by dotted lines. In order to allow free movement of the piston, the portion of the chamber below the diaphragm 25 is vented to the atmosphere through an opening in the bottom or ventral wall of the cylinder 14 and which is indicated at 35 in FIG. 2; a similar opening is provided at 35' in the stop 30 to afford a free passage for air in all positions of the stop.

When the piston comprising the diaphragm 25 and cup 27 is forced downwardly by a pressure of liquid in the chamber above it, it comes to rest when the lower edge of the cup 27 engages an outer flange of the stop 30 indicated at 36. It will be noted that, regardless of the position of the stop 30, when the cup 27 comes to rest against the stop, the spring will be compressed to the same degree which is determined by the depth of the cup 27. Thus, regardless of the setting of the stop, the initial pressure on the liquid in the chamber above the diaphragm 25 and produced by the spring is the same.

Liquid at sufficient pressure to compress the spring until the cup engages the stop is admitted to the interior of the barrel 10 through a port 37 in which the elbow is threaded. The liquid enters a chamber 38 which is an enlarged portion of a passage 40 in the main body portion of the barrel. The button 23 is mounted on a short shaft 41 which carries an annular seat for holding an O-ring 42 in engagement with the inner walls of the chamber 38 and prevents leakage past the left end of the chamber. The O-ring seat comprises a pair of discs 43 and 44 rigidly secured to the shaft 41, and a spring 45 is provided to bias the rod 40 to the left; the movement to the left is limited by a stop pin 46 extending across the passage 38 in the path of the ring 43. The shaft 41 carries an O-ring 47 which is positioned to engage the cylindrical wall of the passage 40 when the rod is moved to the right. The rod at its right hand end carries a valve seat in which an O-ring 48 is positioned for sliding engagement with the cylindrical inner wall near the outer end of the passage 40. The O-rings 47 and 48 which act as seals and valves are so located that the ring 47 closes the passage to prevent the admission of further liquid under pressure, and, at the same time, or preferably shortly thereafter, the ring 48 opens the discharge port or right hand end of the passage 40 so that the liquid is admitted to and discharged from an orifice 50 in the nozzle element 21. Thus the supply pressure of the inlet chamber 38 is cut off before the discharge valve comprising the ring 48 is opened. The nozzle 21 may be provided with various types of orifices to provide the required jet stream or spray. It will not be understood that when the button 23 is pressed to the right, pressure from the supply line 17 is cut off from the chamber within the body 11 and the valve or ring 48 is opened whereupon the spring 28 urges the piston cup 27 upwardly to force liquid out through the passage 40 and nozzle 22. The pressure effective upon opening of the ring or valve 48 is thus independent of the liquid supply pressure upon closing of the ring or valve 47 and is the same regardless of the volume of liquid to be discharged because the spring 28 is held under compression within the confines of the cup 27 regardless of the position of the stop 30. Thus, the discharge effected upon opening of the valve is the same for all quantities of discharge and the operator can effectively use the dispenser to provide a uniform distribution of liquid over the back of the animal or other surface to be treated, or the drenching of the animals' mouth with a predetermined amount of oral treating liquid.

For continuous discharge the plug 20 is removed and the elbow 18 of the line 17 is connected to the barrel, the plug 20 being inserted in the inlet opening provided by removing the elbow 18. The valve 47 is thus bypassed and the control of the discharge is the simple opening and closing of the outlet valve 48.

The position of the cup 15 in its overlapping relationship with the cylindrical body 14 is an indication of the setting of the dispenser since the upper edge of the cup 15 moves with the stop 30 and furthermore the actual quantity to be discharged may be read on the scale 16 provided on the outer wall of the body portion 14. During the use of the dispenser, the button 23 is pressed to open the valve 48 and discharge the measured quantity of liquid while the nozzle is moved over the surface to be treated. Whenever the button 23 is released and returns to its normal position, the chamber within the body 11 is again connected in communication with the pressure supply of liquid and is filled to the position determined by the location of the stop 30. The closing of the valve 47 on the forward movement of the shaft 41 when the button 23 is pressed cuts off the supply of liquid to the interior of the body 11 so that the fixed quantity determined by the setting of the cup 15 is discharged without the addition of liquid flowing from the pressure line. The total quantity discharged upon each operation of the device thus is the same and is determined solely by the location of the stop 30.

The pistol type configuration of the device and the simple push button 23 for controlling the discharge of the insecticide or other liquid facilitates the manipulation and handling of the device and when large numbers of animals are to be treated, this configuration and control greatly facilitate the accurate spreading of the insecticide and the rapid treatment of one animal after another. This pistol-like discharge barrel and easy control also facilitate the use of the device in the application of liquid orally in the drenching process for cattle, sheep and goats.

I claim:

1. A liquid dispenser of the metering type for manual support and manipulation comprising:
   a handpiece including a rigid body having a cylindrical liquid reservoir therein providing a pump chamber,
   piston means in said chamber movable between minimum and maximum volume positions,
   a compression spring for urging said piston means toward its minimum volume position,
   means including an adjustable seat for said spring mounted on said body in said chamber adjacent the end thereof remote from said piston means and movable to positions within a predetermined range for adjusting the effective maximum volume of said chamber, said spring being compressed between said piston means and said seat,
   stop means for determining the minimum distance between said seat and said piston means,
   inlet and outlet ports communicating with said chamber,
   valve means for opening one of said ports and closing the other of said ports and vice versa,
   means for supplying liquid under pressure to said chamber through said inlet port whereby said piston means is moved under pressure to its effective maximum volume position determined by the position of said seat, said spring being compressed to the same maximum compression condition between said seat and said piston means regardless of the position of said seat in said chamber whereby the pressure of discharge of liquid on opening said outlet valve is the same for all positions of said seat, said seat engaging the end of the spring and including a center portion, a rod threaded in the end of said chamber for axial movement with respect thereto and having an end engaging said center portion and rotatable with respect thereto for moving said seat forward and back in said chamber upon rotation of said rod, and a cylindrical cover telescoping over the end of said chamber and attached to said rod for rotational and longitudinal movement therewith for facilitating the rotation of said rod and for indicating the position of said seat in said chamber.

2. A liquid dispenser of the metering type for manual support and manipulation comprising:

a hand piece including a rigid body having a cylindrical liquid reservoir therein providing a pump chamber, piston means in said reservoir and constituting a movable end of said pump chamber and movable between minimum and maximum pump chamber volume positions, a compression spring engaging the side of said piston outside said chamber for urging said piston means toward its minimum pump chamber volume position, means including an adjustable seat for said spring mounted on said body in said reservoir outside said chamber adjacent the end of said reservoir remote from said piston means and movable to positions within a predetermined range for adjusting the effective maximum volume of said chamber, said spring being compressed between said piston means and said seat, stop means for determining the minimum distance between said seat and said piston means and thereby determining the maximum compression of said spring, inlet and outlet ports communicating with said chamber, valve means for opening one of said ports after closing the other of said ports and vice versa, means for supplying liquid under pressure to said chamber through said inlet port whereby said piston means is moved under pressure to its effective maximum volume position determined by the position of said seat, said spring being compressed to the same maximum compression condition between said seat and said piston as determined by said stop means regardless of the position of said seat in said chamber whereby the pressure of discharge of liquid on opening said outlet valve is the same for all positions of said seat, and said body having an upper portion of flattened cross section providing a shouldered configuration constituting a stop limiting the movement of said piston to a fixed minimum volume position.

3. A liquid dispenser of the metering type for manual support and manipulation comprising:

a hand piece including a rigid body having a cylindrical liquid reservoir therein providing a pump chamber, piston means in said reservoir and constituting a movable end of said pump chamber and movable between minimum and maximum pump chamber volume positions, a compression spring engaging the side of said piston outside said chamber for urging said piston means toward its minimum pump chamber volume position, means including an adjustable seat for said spring mounted on said body in said reservoir outside said chamber adjacent the end of said reservoir remote from said piston means and movable to positions within a predetermined range for adjusting the effective maximum volume of said chamber, said spring being compressed between said piston means and said seat, stop means for determining the minimum distance between said seat and said piston means and thereby determining the maximum compression of said spring, inlet and outlet ports communicating with said chamber, valve means for opening one of said ports after closing the other of said ports and vice versa, means for supplying liquid under pressure to said chamber through said inlet port whereby said piston means is moved under pressure to its effective maximum volume position determined by the position of said seat, said spring being compressed to the same maximum compression condition between said seat and said piston as determined by said stop means regardless of the position of said seat in said chamber whereby the pressure of discharge of liquid on opening said outlet valve is the same for all positions of said seat, said valve means comprising cylindrical wall portions adjacent said inlet and outlet ports and rod means carrying seals mounted thereon adjacent the respective ones of said ports, the seal adjacent said inlet port being positioned to enter the cylindrical wall portion adjacent the inlet before the seal adjacent said outlet port moves away from the respective cylindrical wall portion to open said outlet port whereby the inlet pressure is cut off from said chamber before said outlet port is opened and the discharge from said outlet port is independent of the pressure of the liquid in said supply means, a barrel mounted on said body and extending transversely of said cylindrical reservoir and having a passage connecting said ports and an opening providing communication between said passage and said chamber, said barrel having an external opening providing communication with said passage between said inlet and outlet ports and located opposite the opening between said passage and said chamber, a removable plug in said external opening, and said plug being interchangeable with said liquid supplying means whereby liquid under pressure may be supplied directly to said chamber for continuous discharge through said outlet port upon opening of said valve means for said outlet port.

* * * * *